Nov. 23, 1937.   W. A. RIDDELL   2,099,866
PHOTOGRAPHIC SHUTTER
Filed April 18, 1936

William A. Riddell,
INVENTOR:
BY
ATTORNEYS.

Patented Nov. 23, 1937

2,099,866

UNITED STATES PATENT OFFICE 2,099,866

PHOTOGRAPHIC SHUTTER

William A. Riddell, Rochester, N. Y., assignor, by mesne assignments, to Eastman Kodak Company, Jersey City, N. J., a corporation of New Jersey Application April 18, 1936, Serial No. 75,155

6 Claims. (Cl. 95—63)

This invention relates to photography and more particularly to shutters through which light is admitted to the film for making an exposure.

One object of my invention is to provide a simple type of setting shutter in which the mechanism is so arranged that the shutter is easy to set. Another object of my invention is to provide a setting shutter with a master member adapted to turn about a pivot for operating the shutter parts, this member being adapted to be set by a setting lever which is adapted to slide on the shutter casing. Another object of my invention is to provide a shutter in which the setting lever moves through a comparatively long path in order to rotate the master member about its pivot. Other objects will appear from the following specification, the novel features being pointed out in the claims at the end thereof.

In order to obtain relatively high speeds and to obtain efficient shutter operation, it is desirable to have a master member which can move rapidly through a relatively short path under the impulse of a relatively strong setting spring. Such master members are usually difficult to set where the setting lever is attached directly to the master member, and this is particularly true where it is desirable to move the master member through as much as 90° upon its pivot, because it is difficult to provide a setting lever which will move with the master member through such a large angle.

In order to provide a shutter in which the setting may be accomplished by relatively light pressure on a lever which always projects from the shutter casing a like distance, I have provided a master member which is set through the action of a cam and cam follower in which movement of the setting lever in one direction is translated to movement of the master member about a pivot. By this means, it is possible to set a master member even when a comparatively heavy spring is used for a source of power.

Coming now to the drawing, wherein like reference characters denote like parts throughout:

Figure 1:
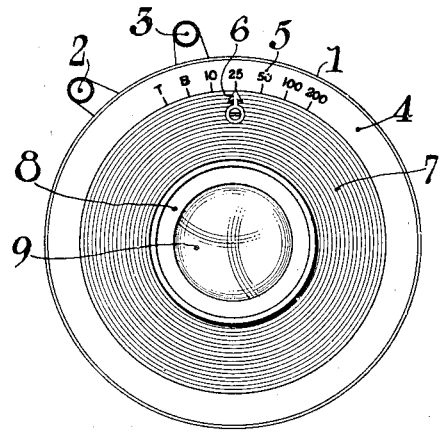
Fig. 1 is a front plan view of a shutter showing a setting mechanism constructed in accordance with and embodying a preferred form of my invention.
Figure 2:
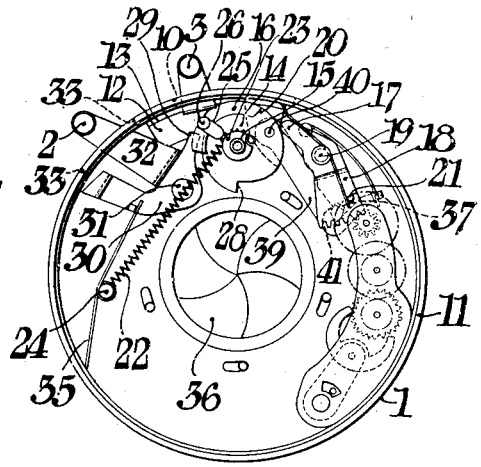
Fig. 2 is a plan view of the shutter shown in Fig. 1, but with the shutter cover and top plates removed, the parts being in a position of rest.

As indicated in Fig. 1, the shutter may consist of a casing 1 which is preferably annular in shape having the usual trigger 2 for tripping the shutter and a setting lever 3 for setting the shutter. The shutter is preferably of the type having a ring 4 which must be turned to bring the desired shutter setting, as indicated on the scale 5, opposite the pointer 6 to indicate the exposure which will be made by the shutter mechanism.

A cover plate 7 surrounds a front lens cell 8 which may carry a part 9 of the objective.

Figure 4:
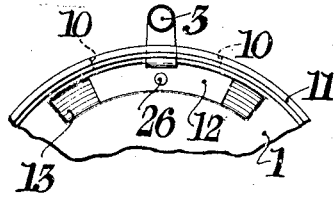
Fig. 4 is a fragmentary detail view showing the groove in which the setting lever may slide.

Referring to Fig. 4, the setting lever 3 extends through an arcuate slot 10 formed in the wall 11 of the shutter casing 1 and is provided with an arcuate shoe 12 which is adapted to slide in the arcuate track 13, which consists of a groove formed in the wall of the shutter casing 1. Thus, when the shutter setting lever 3 is moved in either of two directions, it slides freely through the slot 10 as the shoe 12 is guided through an arcuate path by the track 13. The setting lever 3 moves concentrically of the shutter casing, so that the handle always projects a like distance from the shutter casing, which is desirable as it facilitates setting the shutter.

Figure 3:
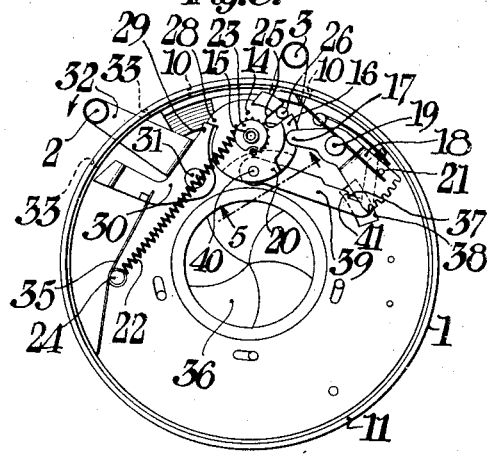
Fig. 3 is a view similar to Fig. 2 with the gear train removed, showing parts of the shutter in a set condition in position for making an exposure.
Figure 5:
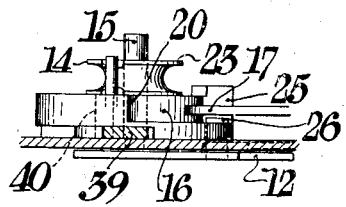
Fig. 5 is an enlarged detail partially in section taken on line 5—5 of Fig. 3 and showing the construction of the master member.

This shutter is of the type in which a master member 14 is mounted to turn upon a stud 15 carried by the shutter casing. As indicated in Fig. 5, the master member 14 is provided with a cut-out portion 16 so that when the shutter is set as indicated in Fig. 3, the operating end 17 of a gear segment 18, pivoted at 19 to the shutter casing, may lie in the cut-out portion, so that when the master member turns, the shoulder 20, by striking arm 17, may swing the gear segment 18 and the exposure will be determined by the position of the gear segment. This position is controlled by a pin 21 from a cam carried by the cover plate 4, which is not shown since this method of controlling shutter speeds is well known in the art.

In order to turn the master member 14 upon its pivot 15, I provide a relatively strong spring 22 which passes around a pulley 23 on the master member at one end and which is anchored to a stud 24 at the other end. The master member is slotted at 25, this slot extending radially of the master member and being adapted to form a cam track which is engaged by the cam follower, which is in the form of a pin 26 carried by the slide 12. Consequently, when the slide 12 is moved, the setting lever turns the master member through the action of the pin 26, engaging the walls of the slot 25.

In order to hold the master member in a set position, there is a latch consisting of a projection 28 on the master member adapted to be engaged by a latch member 29 on the plate 30, pivoted at 31 to the shutter casing, there being an arm 32 extending through a slot 33 in the wall of the shutter casing 1, this arm terminating in the handle 2 so as to form the shutter trigger. When the setting lever 3 is moved to the position shown in Fig. 3, the trigger 2, under the impulse of the spring 35, causes the latch member 29 to engage the projection 28 of the master member. However, as soon as the trigger 2 is pressed downwardly in the direction shown by the arrow in Fig. 3, the latch releases the projection and the master member 14 turns rapidly under the impulse of spring 22, causing the shutter blades to open and close in the following manner.

The shutter blades 36 may be of the standard construction, and may be opened and closed by means of a ring from which a projection 37 extends upwardly through the slot 38, as indicated in Fig. 3. This projection is engaged by a latch member 39 pivotally attached at 40 to the master member and having a shoulder 41 so positioned that a counter-clockwise movement of the master member causes the shoulder to move the lug 37 back and forth, opening and closing the shutter blades, and so shaped that a clockwise movement of the master member, such as is necessary for setting the shutter, permits the member 39 to ride idly past the shutter blade ring lug.

Since the blade operating mechanism is well known in the art, a further description of this part of the shutter construction is considered unnecessary.

As will appear from the above description, the operation of this shutter is extremely simple. With the parts in the position shown in Fig. 1, when it is a desired to make one-twenty-fifth of a second exposure, the setting ring 4 is turned until twenty-five comes opposite the pointer 6. The setting lever 3 is then turned in a clockwise direction, so that the cam follower 26 moves through one path while engaging the cam slot 25 of the master member, turning the master member through another path about its pivot 15 into a set position, in which the projection 28 is engaged by the trigger latch 29. The shutter is then in the position shown in Fig. 3. By depressing the trigger 2 in the direction shown by the arrow, the shutter leaves open and close, the time being determined by the position of the gear segment element 18.

It should be noted that in setting this shutter, the setting lever moves concentrically of the shutter casing, and since it projects a sufficient distance to enable an operator to firmly grasp the setting lever, the shutter is easy to set. The action of the cam pin 26 in the cam groove 25 being a slidable one, in which the shutter setting lever has considerable mechanical advantage, this shutter is easy to set in spite of the fact that a relatively stiff spring is used to operate the oscillatable master member. Moreover, with this construction it is an easy matter to obtain a setting lever for a master member which moves through approximately 90°.

What I claim and desire to be secured by Letters Patent of the United States is:

1. In a shutter of the setting type, the combination with a shutter casing, of a substantially circular master member, a pivot mount for the master member in the casing, a spring adapted to turn the master member in one direction about its pivot, a latch for holding the master member in a set position with the spring under tension, means for setting the master member by turning it through a relatively large angle about its pivot comprising a lever, means for guiding the lever through an arcuate path on the shutter casing, the radius of which is materially greater than the radius of the master member and a pin and slot connection between the lever and master member whereby movement of the lever in the arcuate path through a relatively small angle may move the master member through a much larger angle.

2. In a shutter of the setting type, the combination with a shutter casing, of a substantially circular master member, a pivot mount for the master member in the casing, a spring adapted to turn the master member in one direction about its pivot, a latch for holding the master member in a set position with the spring under tension, means for setting the master member by turning it through a relatively large angle about its pivot comprising a lever, means for guiding the lever through an arcuate path on the shutter casing of materially greater radius than the radius of the master member and concentric with the casing, a handle on the setting lever adapted to extend through a slot in the casing, a pin and slot connection between the lever and master member, said pin being adapted to slide back and forth in said slot as said lever is moved through its relatively large arcuate path to swing the master member in its relatively small arcuate path about its pivotal support.

3. In a shutter of the setting type, the combination with a shutter casing, of a master member pivotally mounted in the casing, a spring adapted to turn the master member toward a position of rest upon its pivot, a latch for holding the master member in a set position in which said spring is under tension, means for setting the master member including a lever, an arcuate slideway in the shutter casing, an arcuate foot on the lever adapted to be guided by the arcuate slideway, and movable connections between the lever and master member for swinging the latter upon its pivot as the arcuate foot on the setting lever slides in the arcuate slideway.

4. In a shutter of the setting type, the combination with a shutter casing, of a master member pivotally mounted in the casing, a spring adapted to turn the master member toward a position of rest upon its pivot, a latch for holding the master member in a set position in which said spring is under tension, means for setting the master member including a lever, an arcuate slideway concentric with the shutter casing adapted to be engaged by the setting lever, a cam and cam follower connection between the setting lever and the master member whereby the latter may be turned upon its pivot by moving the setting lever concentrically with respect to the shutter casing.

5. In a shutter of the setting type, the combination with an annular shaped casing including an arcuate groove concentric with the casing, of a setting lever including a shoe slidable in said arcuate groove and a handle projecting from said casing, a master member, a pivotal support therefor carried by the shutter casing and movable connections between the master member and setting lever to move the former by the latter as the handle is moved concentric with the shutter casing.

6. In a shutter of the setting type, the combination with an annular shaped casing including an arcuate groove concentric with the casing, of a setting lever including a shoe slidable in said arcuate groove and a handle projecting from said casing, a master member, a pivotal support therefor carried by the shutter casing and a radial slot in the master member, a pin carried by the setting lever engaging said slot whereby movement of the setting lever concentric with the shutter casing may turn the master member about its pivot as the pin rides in the slot.

WILLIAM A. RIDDELL.